(12) United States Patent
Ergang et al.

(10) Patent No.: US 8,609,046 B2
(45) Date of Patent: Dec. 17, 2013

(54) GAS STREAM TREATMENT PROCESS

(71) Applicant: Ecolab USA Inc., Naperville, IL (US)

(72) Inventors: Nicholas S. Ergang, Naperville, IL (US); Ian Saratovsky, Highland Park, IL (US); Tommy Chen, Naperville, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 13/646,502

(22) Filed: Oct. 5, 2012

(65) Prior Publication Data

US 2013/0089479 A1     Apr. 11, 2013

Related U.S. Application Data

(60) Provisional application No. 61/544,458, filed on Oct. 7, 2011.

(51) Int. Cl.
   B01D 53/64      (2006.01)

(52) U.S. Cl.
   USPC ............................................. 423/210; 95/134

(58) Field of Classification Search
   USPC ............................................. 423/210; 95/134
   See application file for complete search history.

(56) References Cited

U.S. PATENT DOCUMENTS

| | | | |
|---|---|---|---|
| 4,094,777 A * | 6/1978 | Sugier et al. ............ 210/670 |
| 4,272,409 A | 6/1981 | Bergna |
| 4,474,896 A | 10/1984 | Chao |
| 4,612,138 A | 9/1986 | Keiser et al. |
| 4,927,498 A | 5/1990 | Rushmere |
| 5,164,095 A | 11/1992 | Sparapany et al. |
| 5,196,177 A | 3/1993 | Watanabe |
| 5,334,564 A | 8/1994 | Pinnavaia et al. |
| 5,346,627 A | 9/1994 | Siefert et al. |
| 5,378,399 A | 1/1995 | Kaliski |
| 5,503,820 A | 4/1996 | Moffett et al. |
| 5,520,898 A | 5/1996 | Pinnavaia et al. |
| 5,980,836 A | 11/1999 | Moffett et al. |
| 6,060,523 A | 5/2000 | Moffett et al. |
| 6,077,341 A | 6/2000 | Terase et al. |
| 6,274,112 B1 | 8/2001 | Moffett et al. |
| 6,326,326 B1 | 12/2001 | Feng et al. |
| 6,372,806 B1 | 4/2002 | Keiser et al. |
| 6,521,021 B1 | 2/2003 | Pennline et al. |
| 6,548,149 B1 | 4/2003 | Liu et al. |
| 6,569,908 B2 | 5/2003 | Noguchi et al. |
| 6,632,489 B1 | 10/2003 | Watanabe et al. |
| 6,673,208 B2 | 1/2004 | Persson et al. |
| 6,723,426 B2 | 4/2004 | Fryxell et al. |
| 6,749,825 B2 | 6/2004 | Fryxell et al. |
| 6,752,864 B2 | 6/2004 | Meyer et al. |
| 6,808,692 B2 | 10/2004 | Oehr |
| 6,808,768 B2 | 10/2004 | Satou et al. |
| 6,878,358 B2 | 4/2005 | Vosteen et al. |
| 6,916,943 B2 | 7/2005 | Addiego et al. |
| 7,048,781 B1 | 5/2006 | Lovell |
| 7,156,955 B2 | 1/2007 | Nyander et al. |
| 7,250,148 B2 | 7/2007 | Yang et al. |
| 7,438,875 B2 | 10/2008 | Do et al. |
| 7,504,084 B2 | 3/2009 | Simmons et al. |
| 7,550,060 B2 | 6/2009 | Jacobson et al. |
| 7,553,547 B2 | 6/2009 | Fryxell et al. |
| 7,572,421 B2 | 8/2009 | Yang et al. |
| 7,578,869 B2 | 8/2009 | Yang et al. |
| 7,588,798 B2 | 9/2009 | Alford et al. |
| 7,628,844 B2 | 12/2009 | Hua |
| 7,629,392 B2 | 12/2009 | Nyander et al. |
| 7,662,306 B2 | 2/2010 | Persson et al. |
| 7,753,992 B2 | 7/2010 | Yang et al. |
| 8,025,726 B1 | 9/2011 | Keiser et al. |
| 2005/0084438 A1 | 4/2005 | Do et al. |
| 2005/0170109 A1 | 8/2005 | Chen et al. |
| 2006/0051270 A1 | 3/2006 | Brunette |
| 2006/0078696 A1 | 4/2006 | Furholz et al. |
| 2006/0086834 A1 | 4/2006 | Pfeffer et al. |

(Continued)

FOREIGN PATENT DOCUMENTS

| | | |
|---|---|---|
| GB | 1587236 | 4/1981 |
| JP | 2008533432 | 8/2008 |
| WO | 98/34723 | 8/1998 |
| WO | 00/56450 | 9/2000 |

OTHER PUBLICATIONS

International Search Report and Written Opinion for Application No. PCT/US2012/059069 dated Dec. 11, 2012 (9 pages).
"Environmental Application of Mineral Sulfides for Removal of Gas-Phase HG(0) and Aqueous HG2+", P.J. Martellaro, G.A. Moore, E.S. Peterson, E.H. Abbott, A.E. Gorenbain, Separation Science and Technology, 36(5 & 6), pp. 1183-1196, 2001 [no month].
"Nanoscale metal sulfides for mercury sorptoin" (abstract only), E.S. Peterson, P.J. Martellaro, G. A. Moore, Abstracts of Papers, 235th ACS National Meeting, New Orleans, LA, Apr. 6-10, 2008.
"Mercury-sorption characteristics of nanoscale metal sulfides" (abstract only), G.A. Moore, P.J. Martellaro, E.S. Peterson, Studies in Surface Science and Catalysis (2000),129(Nanoporous Materials II, Proceedings of the Conference on Access in Nanoporous Materials, 2000), pp. 765-772 [no month].
Iler, Raplh K. "Chemistry of Silica: Solubility, polymerization, colloid, and surface properties, and biochemistry" 1979, Wiley, pp. 5, 154, 155, 462, and 549.

Primary Examiner — Timothy Vanoy
(74) Attorney, Agent, or Firm — Edward O. Yonter; Andrew D. Sorensen

(57) ABSTRACT

A process of treating a gas stream containing mercury and acid gas pollutants is disclosed. The process includes applying a sorbent composition into a gas stream in order to adsorb mercury containing compounds and acid gas pollutants. The sorbent composition includes a compound having the formula $(SiO_2)x(OH)_yM_zS_aF.B$. The combination of basic inorganic solids for the adsorption of acid gases, and metal sulfide-doped silica for the adsorption of mercury provides dual sorbent functionality, along with additional benefits for each individual sorbent: silica for moisture retention on the surface of the basic inorganic particle and adsorption of acid gas, which will improve metal sulfide performance at higher operating temperatures. The use of a hygroscopic solid effectively dries the metal sulfide-doped silica slurry without the use of filtration of drying equipment, providing significant economic benefit for the manufacture of metal sulfide-doped silica material.

28 Claims, 2 Drawing Sheets

(56) References Cited

U.S. PATENT DOCUMENTS

| | | |
|---|---|---|
| 2007/0026531 A1 | 2/2007 | Mattigood et al. |
| 2007/0053846 A1 | 3/2007 | Dave et al. |
| 2007/0122327 A1 | 5/2007 | Yang et al. |
| 2007/0231249 A1 | 10/2007 | Batllo et al. |
| 2007/0282122 A1 | 12/2007 | Holland et al. |
| 2008/0034968 A1 | 2/2008 | Nordberg et al. |
| 2008/0085412 A1 | 4/2008 | Ortiz |
| 2009/0047200 A1 | 2/2009 | Holmes et al. |
| 2009/0101015 A1 | 4/2009 | Hua |
| 2010/0251938 A1 | 10/2010 | Comrie |
| 2011/0030592 A1 | 2/2011 | Baldrey et al. |
| 2011/0076210 A1 | 3/2011 | Pollack et al. |
| 2011/0123422 A1 | 5/2011 | Wang |
| 2011/0195003 A1 | 8/2011 | Durham et al. |
| 2011/0250110 A1* | 10/2011 | Keiser et al. .................. 423/210 |
| 2011/0314821 A1 | 12/2011 | Bookbinder et al. |
| 2012/0263634 A1* | 10/2012 | Ergang et al. .............. 423/215.5 |

* cited by examiner

GAS STREAM TREATMENT PROCESS

CROSS-REFERENCE TO RELATED APPLICATION

This claims priority to U.S. provisional patent application No. 61/544,458, filed on Oct. 7, 2011, the content of which is hereby fully incorporated by reference.

TECHNICAL FIELD

This disclosure pertains to a process of treating a gas stream, e.g. a gas stream containing at least mercury and acid gases such as sulfur dioxide, sulfur trioxide, and hydrogen chloride.

BACKGROUND

Mercury and acid gas emission control is desired by the power generation industry. A more facile way of controlling mercury and acid gas emissions from heat generating systems is sought by the industry.

An established methodology currently in practice for the control of mercury emissions is the addition of halogen containing compounds to fuels or to flue gases to enhance the oxidation of mercury, thereby facilitating its capture by sorbents and scrubber liquors (see U.S. Pat. No. 6,808,692 and U.S. Pat. No. 6,878,358, both of which are herein incorporated by reference). However, the current use of activated carbon-type compounds for mercury adsorption can adversely affect the potential sale of fly ash products by the power generation industry, resulting in a desire for an inorganic sorbent capable of mercury adsorption without affecting fly ash quality.

Current emission control strategies for acidic gas species (e.g., HCl, $SO_2$, and $SO_3$) rely on solid sorbents for removal of pollutants from exhaust gas streams. The reduction of HCl, $SO_2$, and $SO_3$ are achieved by injection of basic sorbents into a dry scrubber or upstream of particulate control devices (e.g., electrostatic precipitator, fabric filter, or Venturi seperator). In particular, basic materials are injected into the flue gas stream to contact the gas and neutralize acid gases, including hydrogen halides, $SO_2$, $SO_3$, and other acid gas species. Typical sorbents include hydrated lime (i.e., $Ca(OH)_2$), sodium carbonate (i.e., $Na_2CO_3$), sodium bicarbonate (i.e., $NaHCO_3$), and trona (i.e., $Na_2CO_3.NaHCO_3.xH_2O$). Although sodium-containing sorbents can be effective, they are often prohibitively expensive owing to localized availability and their propensity to foul power plant equipment. Additionally, sodium-containing sorbents are often soluble in water, and can potentially leach into the surrounding environment after the ash is landfilled. On the other hand, hydrated lime is relatively inexpensive; however the reactions between acid gases and hydrated lime are often less efficient than with their sodium-containing counterparts. Accordingly, there exists a need for improved sorbents for control of mercury and acidic gas species emissions from gas streams.

SUMMARY

In one aspect, disclosed is a sorbent composition comprising a compound having formula (I), $$(SiO_2)_x(OH)_y M_z S_a F.B \qquad (I)$$

wherein

M is a metal or metalloid cation selected from boron, magnesium, aluminum, calcium, titanium, vanadium, manganese, iron, cobalt, nickel, copper, zinc, zirconium, molybdenum, palladium, silver, cadmium, tin, platinum, gold, and bismuth;

S is a sulfur-based species selected from at least one of the following: sulfide salts, dithiocarbamates, polymer-based dithiocarbamates, and polysulfide salts;

F optionally exists and said F is at least one of the following: a functionalized organosilane, a sulfur-containing organosilane, an amine-containing organosilane, or an alkyl-containing organosilane at a surface area coverage of about 0.01 to about 100%;

B is a hygroscopic solid at a preferred water to solid molar ratio of about 0.1 to about 6, and more particularly, B is a basic inorganic solid selected from alkali or alkali-earth metal oxides, hydroxides, carbonates, and bicarbonates, said basic inorganic solid containing a metal cation selected from calcium, magnesium, strontium, barium, sodium, lithium, potassium, cesium, lanthanum, cerium, praseodymium, neodymium, samarium, europium, gadolinium, dysprosium, scandium, ytterbium, yttrium, and erbium; and the molar ratio of y/x is equal to about 0.01 to about 0.5;
the molar ratio of x/z is equal to about 0.5 to about 300; and
the molar ratio of a/z is about 0.5 to about 5.

The sorbent composition may comprise a compound having a formula of: $(SiO_2)_{15}(OH)_x.CuS_5.bCa(OH)_2$, where x is the surface concentration of hydroxyl species as determined by the moisture content and b is the relative amount of hydrated lime.

In another aspect, disclosed is a product produced by the addition of an aqueous-based composition to a hygroscopic solid, such that the aqueous portion is adsorbed by the solid to form a hydrated product. The hydrated product may comprise a compound having the formula $(SiO_2)_x(OH)_y M_z S_a F.B$. M is selected from at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein S is a sulfur-based species selected from at least one of the following: sulfide salts, dithiocarbamates, polymer-based dithiocarbamates, and polysulfide salts; wherein F optionally exists and said F is at least one of the following: a functionalized organosilane, a sulfur-containing organosilane, an amine-containing organosilane, or an alkyl-containing organosilane at a surface area coverage of about 0.01 to about 100%; wherein the molar ratio of y/x is equal to about 0.01 to about 0.5, the molar ratio of x/z is equal to about 0.5 to about 300, and the molar ratio of a/z is about 0.5 to about 5. B comprises a hygroscopic solid at a water to solid molar ratio of about 0.1 to about 6 and B comprises at least one alkaline earth oxide or lanthanide oxide.

In another aspect, disclosed is a method of forming a silica-containing product/composition comprising: a) providing a silica-containing precursor (SCP) contained in solution that has a pH less than or equal to a pH of about 7; b) optionally doping the SCP with one or more metal species, wherein said doping occurs when the solution has a pH less than or equal to a pH of about 7; c) adjusting the pH of the solution to greater than about 7; d) adding an effective amount of salt to the solution so that the conductivity of the solution is greater than or equal to about 4 mS, wherein said addition occurs prior to, simultaneous with, or after the pH adjustment in step c; e) optionally filtering and drying the SCP; f) optionally reacting the dried product from step e with a functional group and optionally wherein the resultant functionalized dried product is at least one of the following: a functionalized metal oxide-doped or metal sulfide-doped silica-containing product; and g) adding the aqueous-based SCP to a hygroscopic solid such that the resulting product comprises a metal oxide-doped or metal sulfide-doped silica-containing product deposited on a hydrated alkaline earth oxide or lanthanide oxide substrate.

In another aspect, disclosed is a method of forming a silica-containing product/composition comprising: a) providing a silica-containing precursor (SCP) contained in solution that has a pH greater than 7; b) adjusting the pH of the solution to less than or equal to about 7; c) optionally doping the SCP with one or more metal species, wherein said doping occurs when the solution has a pH less than or equal to a pH of about 7; d) adjusting the pH of the solution to greater than about 7; e) adding an effective amount of salt to the solution so that the conductivity of the solution is greater than or equal to about 4 mS, wherein said addition occurs prior to, simultaneous with, or after the pH adjustment in step d; f) optionally filtering and drying the SCP; g) optionally reacting the dried product from step f with a functional group and optionally wherein the resultant functionalized dried product is at least one of the following: a functionalized metal oxide-doped or metal sulfide-doped silica-containing product; and h) adding the aqueous-based SCP to a hygroscopic solid such that the resulting product comprises a metal oxide-doped or metal sulfide-doped silica-containing product deposited on a hydrated alkaline earth oxide or lanthanide oxide substrate.

In another aspect, disclosed is a process of treating a gas stream containing mercury and acid pollutants, including sulfur oxides and hydrogen halides, comprising: applying a sorbent into said gas stream ahead of a particulate matter collection device, in order to adsorb at least a portion of a mercury containing compound and at least a portion of said sulfur oxide and hydrogen halide pollutants concurrently, wherein said sorbent contains a composition comprising a compound having the following formula $(SiO_2)_x(OH)_y M_z S_a F.B$. M is selected from at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein S is a sulfur-based species selected from at least one of the following: sulfide salts, dithiocarbamates, polymer-based dithiocarbamates, and polysulfide salts; wherein F optionally exists and said F is at least one of the following: a functionalized organosilane, a sulfur-containing organosilane, an amine-containing organosilane, or an alkyl-containing organosilane at a surface area coverage of about 0.01 to about 100%; wherein the molar ratio of y/x is equal to about 0.01 to about 0.5, the molar ratio of x/z is equal to about 0.5 to about 300, and the molar ratio of a/z is about 0.5 to about 5. B comprises a hygroscopic solid at a water to solid molar ratio of about 0.1 to about 6 and B comprises at least one alkaline earth oxide or lanthanide oxide.

DETAILED DESCRIPTION

Figure 1:
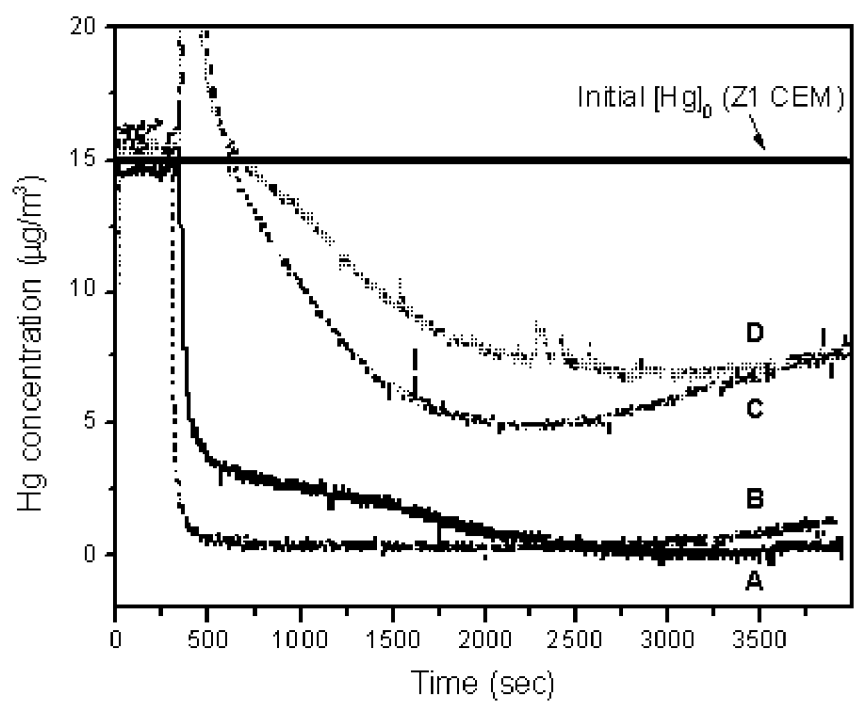
FIG. 1 depicts remaining Hg concentration detected by the outlet Z3 CEM as a function of time after passing through individual sorbent bed (A: Sample 4; B: the mixture of copper sulfide-doped silica and diatomaceous earth; C: silica-containing hydrated lime; and D: conventional hydrated lime).

Disclosed herein are dry, flowable, dual-use inorganic sorbents capable of adsorbing both mercury and acid gas pollutants. The sorbents include a water-retention additive (e.g., a silicate) to maintain a locally moist environment near the sorbent particle surfaces, a basic inorganic component (e.g., $Ca(OH)_2$) to neutralize acid gas species, and a sulfur-based component (e.g., copper sulfide) to capture mercury species. It is believed that addition of the basic inorganic component to the metal sulfide-containing particle adsorbs acid gases from the gas stream, allowing for improved mercury sequestration by the metal sulfide component. Additionally, it is believed that incorporation of moisture at the sorbent particle surfaces aids in solubilization and reaction of acid gas species with the sorbent basic inorganic surfaces.

Combination of the metal sulfide-doped silica with basic inorganic materials, in addition to providing a dual function sorbent, provides additional benefits beyond that provided by each sorbent separately. The sorbents eliminate the need for humidifying an entire flue gas stream, and avoid the problems associated with in-duct humidification and slurry injection associated with other sorbent types. Furthermore, the sorbents have unexpectedly high surface areas and pore volumes relative to lime hydrated at the same rate, thereby providing greater efficiency of acid species sequestration. The sorbents exhibit improved HCl capture relative to trona and hydrated lime. In fact, the presence of a metal sulfide moiety in the silica further improves the HCl capture over a hydrated lime sorbent containing only silica. Hg capture on the dual function sorbent is also improved over time relative to metal sulfide-doped silica powder without hydrated lime present.

Use of a hygroscopic material to dry the metal sulfide-doped silica slurry provides an added economic benefit for the manufacture of said sorbent in powder form. The as-synthesized metal sulfide-doped silica slurry contains water which is adsorbed by the hygroscopic solid, effectively drying the metal sulfide-doped silica particles without the use of other filtration/drying techniques. This method of drying allows for the manufacture of a dry mercury/acid gas sorbent powder without the need for significant expensive filtration and drying equipment.

1. DEFINITION OF TERMS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used in the specification and the appended claims, the singular forms "a," "and" and "the" include plural references unless the context clearly dictates otherwise. The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not.

2. SORBENT COMPOSITIONS

The sorbent compositions disclosed herein include at least one active sorbent compound useful for capture of acid gas species and mercury species from a gas stream. In certain embodiments, the sorbent compositions consist of or consist essentially of one or more active sorbent compounds, as described herein. In other embodiments, the sorbent compositions may optionally include one or more additional components beyond the at least one active sorbent compound. The sorbent compositions may include various combinations of sorbent compounds and associated compositions. The active sorbent compound(s) can be in various forms and proportions relative to the one or more additional components of the compositions. In certain embodiments, the sorbent compositions can stand alone, be further modified by chemical and/or physical means, or integrated into other products (e.g., consumer or industrial products).

The sorbent compositions may comprise the active sorbent compound(s) in any suitable amount for the intended application. In certain embodiments, the sorbent composition may comprise about 40% to about 99% by weight active sorbent compound, about 60% to about 99% by weight active sorbent compound, or about 80% to 99% by weight active sorbent compound.

In certain embodiments, the sorbent compositions may comprise excess moisture of greater than 3 weight %. In certain embodiments, the sorbent compositions may have a moisture content of 1 weight %, 2 weight %, 3 weight %, 4 weight %, 5 weight %, 6 weight %, 7 weight %, 8 weight %, 9 weight %, 10 weight %, 11 weight %, 12 weight %, 13 weight %, 14 weight %, 15 weight %, 16 weight %, 17 weight %, 18 weight %, 19 weight %, 20 weight %, 21 weight %, 22 weight %, 23 weight %, 24 weight %, 25 weight %, 26 weight %, 27 weight %, 28 weight %, 29 weight %, 30 weight %, 31 weight %, 32 weight %, 33 weight %, 34 weight %, 35 weight %, 36 weight %, 37 weight %, 38 weight %, 39 weight %, or 40 weight %. In certain embodiments, the sorbent compositions may have a moisture content ranging from 1 weight % to 40 weight %, from 3 weight % to 40 weight %, from 3 weight % to 30 weight %, or from 3 weight % to 20 weight %.

In certain embodiments, the sorbent compositions may be a powder, preferably a free-flowing powder. The sorbent compositions may comprise about 40% to about 99% by weight active compound and about 60% to 1% moisture; about 60% to about 99% by weight active compound and about 40% to about 1% moisture; or about 80% to 99% by weight active compound and about 20% to 1% moisture. The sorbent composition may be characterized by a particle size of about 2 µm to about 500 µm, about 2 µm to about 200 µm, about 2 µm to about 40 µm, about 2 µm to about 20 µm, or about 5 µm to about 20 µm. The sorbent composition may be characterized by a surface area of about 2 m²/g to about 800 m²/g, or about 2 m²/g to about 200 m²/g. The sorbent composition may be characterized by a pore volume of 0.01 cc/g to 2.0 cc/g, preferably about 0.01 cc/g to about 1.0 cc/g.

a. Active Sorbent Compound

The active sorbent compound may be a compound having a hydroscopic silicate component, a basic solid component, and a sulfur-based component. The silicate component may maintain a locally moist environment near the sorbent particle surface to aid in solubilization and reaction of acid gas species with the sorbent particle basic solid component surfaces. The neutralization of the acid gas species by the basic inorganic component may allow for improved mercury sequestration by the sulfur-based component.

In certain embodiments, the active sorbent compound may have formula (I):

$$(SiO_2)_x(OH)_y.M_zS_aF.B \qquad (I)$$

wherein

M is a metal or metalloid cation selected from the group consisting of: boron, magnesium, aluminum, calcium, titanium, vanadium, manganese, iron, cobalt, nickel, copper, zinc, zirconium, molybdenum, palladium, silver, cadmium, tin, platinum, gold, and bismuth;

S is a sulfur-based species selected from the group consisting of: sulfide salts, dithiocarbamates, polymer-based dithiocarbamates, and polysulfide salts;

F optionally exists and when present is selected from the group consisting of: a functionalized organosilane, a sulfur-containing organosilane, an amine-containing organosilane, and an alkyl-containing organosilane at a surface area coverage of 0.01-100%;

B is a hygroscopic solid at a preferred water to solid molar ratio of about 0.1 to about 6, and more particularly, B is a basic inorganic solid selected from alkali or alkali-earth metal oxides, hydroxides, carbonates, and bicarbonates, said basic inorganic solid containing a metal cation selected from calcium, magnesium, strontium, barium, sodium, lithium, potassium, cesium, lanthanum, cerium, praseodymium, neodymium, samarium, europium, gadolinium, dysprosium, scandium, ytterbium, yttrium, and erbium;

the molar ratio of y/x is equal to about 0.01 to about 0.5;
the molar ratio of x/z is equal to about 0.5 to about 300; and
the molar ratio of a/z is about 0.5 to about 5.

In certain embodiments, the active sorbent compound may have formula (II):

$$(SiO_2)_{15}(OH)_y.CuS_5.bCa(OH)_2 \qquad (II),$$

wherein y is the surface concentration of hydroxyl species as determined by moisture content; and b is the relative amount of hydrated lime.

In certain embodiments, the active sorbent compound has formula $(SiO_2)_{15}(OH)_y.CuS_5.1251Ca(OH)_2$ wherein y is the concentration of hydroxyl species on the silicate surface as determined by moisture content.

In certain embodiments, the active sorbent compound has formula $(SiO_2)_{100}(OH)_y.CuS_5.5827Ca(OH)_2$ wherein y is the concentration of hydroxyl species on the silicate surface as determined by moisture content.

In certain embodiments, the active sorbent compound has formula $(SiO_2)_{15}(OH)_y.CuS_5.1196Ca(OH)_2$ wherein y is the concentration of hydroxyl species on the silicate surface as determined by moisture content.

In certain embodiments, the active sorbent compound has formula $(SiO_2)(OH)_y.CuS_5.441Ca(OH)_2$ wherein y is the concentration of hydroxyl species on the silicate surface as determined by moisture content.

b. Other Components

The sorbent compositions may include other components. In certain embodiments, the sorbent composition may be provided as a powder blended with mercury sorbents such as activated carbon, halogenated activated carbon, and/or inorganic mercury sorbents. In certain embodiments, the sorbent composition may include a silica containing composition as described in U.S. Pat. No. 8,025,726, which is herein incorporated by reference. In certain embodiments, the sorbent composition may include 1 to 50% by weight other inorganic sorbents, such as aluminosilicates, silica-containing materials, clays, or zeolites (e.g., synthetic zeolites). In certain embodiments, the sorbent compositions may include 1 to 50% by weight activated carbon. The activated carbon may be produced by the Thief Carbon process as described in U.S. Pat. No. 6,521,021, which is herein incorporated by reference. In certain embodiments, the activated carbon may be prepared from carbon based starting materials, such as coal, lignite, wood, wood byproducts, or bark. In certain embodiments, the activated carbon may be replaced with or mixed with halogenated activated carbon, such as chlorinated activated carbon or brominated activated carbon. In certain embodiments, the sorbent compositions may include 1% to 50% by weight of a silica based mercury sorbent or aluminosilicate based mercury sorbent, such as that described in U.S. Pat. No. 7,572,421, which is herein incorporated by reference.

In certain embodiments, the sorbent compositions may be blended with alkaline sulfur oxide sorbents. Alkaline sulfur oxide sorbents include, but are not limited to, trona, calcium hydroxide, lime, hydrated lime, and calcium oxide containing compounds or materials. In certain embodiments, the alkaline sulfur oxide sorbent may be applied upstream of the sorbent in a scrubber process. In certain embodiments, the sulfur oxide alkaline-containing sorbent may be added separately from the sorbent by such methods as FSI (Furnace Sorbent Injection).

In certain embodiments, the sorbent composition further contains one or more halogens.

c. Synthetic Methods

In certain embodiments, the sorbent compositions may be prepared by combining in an aqueous medium a silica containing precursor, a metal (e.g., a metal salt), and a sulfur-based species; and adding to a hygroscopic solid (e.g., a basic inorganic solid) at least a portion of the aqueous medium containing the silica containing precursor, the metal (e.g., a metal salt), and the sulfur-based species, such that the aqueous portion is adsorbed by the solid to form a hydrated product. Optionally, the composition formed by combination of the silica containing precursor, metal (e.g., a metal salt), and sulfur-based species, or the hydrated product may be further functionalized with an organosilane species.

i. Silica Containing Precursors

The silica containing precursor (SCP) may be silicic acid, colloidal silica, tetraethylorthosilicate, dispersed fumed silica, alkaline silicates (e.g., sodium or potassium silicate), or a combination thereof. In one preferred embodiment, the silica containing precursor is silicic acid. In another preferred embodiment, the silica containing precursor is Nalco 8691 silica sol, which can be obtained from Nalco Company, 1601 West Diehl Road, Naperville, Ill. 60563.

The aqueous-based silicate-containing precursor may be prepared by dispersing one or more silica containing precursors in deionized water. The aqueous-based silicate-containing precursor solution may comprise from 1 weight % to 50 weight % SCP, from 2 weight % to 20 weight % SCP, or from 3 weight % to 8 weight % SCP.

ii. Metal Species

The metal species may be any suitable species to prepare the actives component. In certain embodiments, the metal species may be a metal species containing boron, magnesium, aluminum, calcium, titanium, vanadium, manganese, iron, cobalt, nickel, copper, zinc, zirconium, molybdenum, palladium, silver, cadmium, tin, platinum, gold, or bismuth. In certain embodiments, the metal species may be a copper species (e.g., copper nitrate, copper sulfate, copper chloride, or the like).

iii. Sulfur-Based Species

The sulfur-based species may be selected from sulfide salts, dithiocarbamates, polymer-based dithiocarbamates, and polysulfide salts. Sulfide salts include, but are not limited to, sodium sulfide, potassium sulfide, and/or metal sulfides such as copper sulfide. Dithiocarbamates include, but are not limited to, dimethyldithiocarbamate (DMDTC) or diethyldithiocarbamate (DEDTC). Polymer-based dithiocarbamates contain organic polymers containing the functional group $R_nCS_2$ wherein R is an alkyl group which is linear or branched. An example of a commercially available polymer-based dithiocarbamate is described in U.S. Pat. Nos. 5,164,095 and 5,346,627, which are herein incorporated by reference. Polysulfides that can be used include, but are not limited to, sodium polysulfide and calcium polysulfide.

iv. Organosilanes

Organosilanes that can be used are well known in the art and may be represented generally by $R_{(4-a)}-SiX_a$, wherein a may be from 1 to 3. The organo-functional group, R—, may be any aliphatic or alkene containing functionalized group such as propyl, butyl, 3-chloropropyl, amine, thiol, and combinations thereof. X is representative of a hydrolysable alkoxy group, typically methoxy or ethoxy. Some examples are 3-thiopropyl and mercaptopropyl silanes.

Thiols and amines are represented generally by the class of organic and inorganic compounds containing the amine or thiol group having the general formula —B—(SH) or —B—(NH$_2$), wherein B is a linear or branched group consisting of carbon atoms such as —(CH$_2$)$_n$—, wherein n is from 1 to 15, 1 to 6, or where n is 3.

v. Basic Inorganic Solid

Suitable basic inorganic solids include, but are not limited to, alkali and alkali-earth metal oxides, hydroxides, carbonates, and bicarbonates, such that the aqueous portion is adsorbed by the basic solid to form a hydrated product in a free-flowing powder form. The basic inorganic solid may be calcium oxide (lime), calcium hydroxide (hydrated lime), dolomitic lime, calcium carbonate, magnesium oxide, magnesium hydroxide, magnesium carbonate, sodium carbonate, sodium bicarbonate, trona, sodium oxide, sodium hydroxide, potassium oxide, potassium hydroxide, potassium carbonate, or a combination thereof.

vi. Salts

During the preparation of the sorbent compositions and/or the actives component, salt may be added to increase the conductivity of the aqueous reaction solution to 4 mS. Examples of the salts that can be used include, but are not limited to, alkali and alkaline halides, sulfates, phosphates, and nitrates such as sodium sulfite, potassium chloride, sodium chloride, sodium nitrate, calcium sulfate, and potassium phosphate. One skilled in the art would recognize that the effective amount of salt added to reach the desired conductivity will vary dependent on the salt of choice.

vii. Synthetic Method I—Acidic Starting Point

One synthetic methodology for preparing the sorbent compositions and/or the actives component involves starting from an acidic starting point. In certain embodiments, the sorbent compositions may be prepared by a process including: a) providing a silica containing precursor (SCP) (e.g., silicic acid, colloidal silica, tetraethylorthosilicate, or dispersed fumed silica) contained in aqueous solution that has a pH less than or equal to a pH of 7, preferably from 3 to 4; b) optionally doping the SCP with one or more metal species, wherein said doping occurs when the solution has a pH less than or equal to a pH of 7; c) adjusting the pH of the solution to greater than 7; d) adding an effective amount of salt to the solution so that the conductivity of the solution is greater than or equal to 4 mS, wherein said addition occurs prior to, simultaneous with, or after the pH adjustment in step c; e) optionally filtering and drying the SCP; f) optionally reacting the dried product from step e with a functional group (e.g., an organosilane) and optionally wherein the resultant functionalized dried product is at least one of the following: a functionalized metal oxide-doped or metal sulfide-doped silica product; and g) adding the aqueous-based SCP to a hygroscopic solid such that the resulting product comprises a metal oxide-doped or metal sulfide-doped silica-containing product deposited on a hydrated alkaline earth oxide or lanthanide oxide substrate. In certain embodiments, the addition of salt in step d may not be necessary.

In certain embodiments, the pH of the SCP may be adjusted to greater than 7 by mixing/interacting the molecules of said SCP with an alkaline solution at a shear rate of 6 to 23 m/s based on tip speed. The process may include adjusting the pH of the SCP to greater than 7 by mixing said SCP with an alkaline solution via a mixing chamber. An example of a mixing chamber is described in U.S. Pat. No. 7,550,060, "Method and Arrangement for Feeding Chemicals into a Process Stream", which is herein incorporated by reference. The pH of the SCP may be adjusted to greater than 7 by combining said SCP with an alkaline solution with mixing, yielding a Reynolds Number greater than or equal to 2000, to form the silica based product. The pH of the SCP may be adjusted to greater than 7 by combining said SCP with an alkaline solution under transitional flow conditions, i.e. Reynolds Numbers between 2000 and 4000, to form the silica based product. The pH of the SCP may be adjusted to greater than 7 by combining said SCP with an alkaline solution under turbulent flow conditions, i.e. Reynolds Numbers greater than or equal to 4000, to form the silica based product.

The pH of the SCP may be adjusted to a pH range of 7 to 11 with the use of a chemistry selected from at least one of the following: ammonium hydroxide, ammonium carbonate, mineral bases such as, but not limited to, sodium hydroxide and/or potassium hydroxide, organic bases such as, but not limited to, trimethylammonium hydroxide, alkaline silicates, sulfide salts such as, but not limited to, sodium sulfide, and polysulfide containing salts such as, but not limited to, calcium polysulfide and/or sodium polysulfide.

In certain embodiments, the sorbent compositions may be prepared using PARETO™ mixing technology. Additionally, Ultra Turax, Model Number UTI-25 (available from IKA® Works, Inc. in Wilmington, N.C.), a mixing device, can be utilized.

In certain embodiments, the sorbent compositions may be prepared using one or more mixing chambers as described in U.S. Pat. No. 7,550,060, which is herein incorporated by reference. The mixing chamber may include a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber. The mixing chamber can be attached or in communication with a receptacle that holds/processes through (e.g., a conduit) a mixed product. In certain embodiments, the mixing chamber can be attached or in communication with a receptacle that holds/processes a mixed product resulting from said pH adjustment of said SCP.

In certain embodiments, the aqueous-based SCP is added to a hygroscopic inorganic solid in a fluidized bed mixer such that the water is adsorbed uniformly by the solid to form a hydrated powder containing the SCP.

In certain embodiments, the dried product from step g may functionalized by surface treating the dried product with an organosilane via controlled hydrolysis and condensation of the silane to the silica surface. The dried product may be functionalized in an organic solvent, a supercritical solvent, or a solvent-free process.

viii. Synthetic Method II—Alkaline Starting Point

Another synthetic methodology involves starting from an alkaline starting point. In certain embodiments, the sorbent compositions may be prepared by a process including: a) providing a silica containing precursor (SCP) (e.g., alkaline silicates) contained in solution that has a pH greater than 7; b) adjusting the pH of the solution to less than or equal to 7; c) optionally doping the SCP with one or more metal species, wherein said doping occurs when the solution has a pH less than or equal to a pH of 7; d) adjusting the pH of the solution to greater than 7; e) adding an effective amount of salt to the solution so that the conductivity of the solution is greater than or equal to 4 mS, wherein said addition occurs prior to, simultaneous with, or after the pH adjustment in step d; f) optionally filtering and drying the SCP; g) optionally reacting the dried product from step f with a functional group (e.g., an organosilane) and optionally wherein the resultant functionalized dried product is at least one of the following: functionalized metal oxide-doped or metal sulfide-doped silica product; and h) adding the aqueous-based SCP to a hygroscopic solid such that the resulting product comprises a metal oxide-doped or metal sulfide-doped silica-containing product deposited on a hydrated alkaline earth oxide or lanthanide oxide substrate. In certain embodiments, the addition of salt in step e may not be necessary.

In certain embodiments, the pH of the silicon-containing precursor may be adjusted to a pH of less than or equal to 7 through the use of at least one of the following: carbonic acid, an organic acid(s) such as but not limited to acetic acid, a mineral acid(s) such as but not limited to sulfuric acid and/or hydrochloric acid. The pH may be decreased to a range of from to 2 to 7. In one embodiment, the pH range of the SCP may be adjusted to a range of 3 to 4 with acetic acid.

In certain embodiments, the pH of the SCP may be adjusted to greater than 7 by mixing/interacting the molecules of said SCP with an alkaline solution at a shear rate of 6 to 23 m/s based on tip speed. The proces may include adjusting the pH of the SCP to greater than 7 by mixing said SCP with an alkaline solution via a mixing chamber. An example of a mixing chamber is described in U.S. Pat. No. 7,550,060, "Method and Arrangement for Feeding Chemicals into a Process Stream", which is herein incorporated by reference. The pH of the SCP may be adjusted to greater than 7 by combining said SCP with an alkaline solution with mixing, yielding a Reynolds Number greater than or equal to 2000, to form the silica based product. The pH of the SCP may be adjusted to greater than 7 by combining said SCP with an alkaline solution under transitional flow conditions, i.e. Reynolds Numbers between 2000 and 4000, to form the silica based product. The pH of the SCP may be adjusted to greater than 7 by combining said SCP with an alkaline solution under turbulent flow conditions, i.e. Reynolds Numbers greater than or equal to 4000, to form the silica based product.

The pH of the SCP may be adjusted to a pH range of 7 to 11 with the use of a chemistry selected from at least one of the following: ammonium hydroxide, ammonium carbonate, mineral bases, organic bases, alkaline silicates, sulfide salts, and polysulfide containing salts.

In certain embodiments, the sorbent compositions may be prepared using PARETO™ mixing technology. Additionally, Ultra Turax, Model Number UTI-25 (available from IKA® Works, Inc. in Wilmington, N.C.), a mixing device, can be utilized.

In certain embodiments, the sorbent compositions may be prepared using one or more mixing chambers as described in U.S. Pat. No. 7,550,060, which is herein incorporated by reference. The mixing chamber may include a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber. The mixing chamber can be attached or in communication with a receptacle that holds/processes through (e.g., a conduit) a mixed product. In certain embodiments, the mixing chamber can be attached or in communication with a receptacle that holds/processes a mixed product resulting from said pH adjustment of said SCP.

In certain embodiments, the aqueous-based SCP is added to a hygroscopic inorganic solid in a fluidized bed mixer such that the water is adsorbed uniformly by the solid to form a hydrated powder containing the SCP.

In certain embodiments, the dried product from step h may be functionalized, such as by surface treating the dried product with an organosilane via controlled hydrolysis and condensation of the silane to the silica surface. The dried product may be functionalized in an organic solvent, a supercritical solvent, or a solvent-free process.

4. METHOD OF USE

The sorbent compositions disclosed herein may be used in any process in which it is desirable to remove acid species and/or mercury species from a gas stream. The sorbent compositions may be used at coal-fired power plants (e.g., bituminous coal-fired, or lignite-fired power stations), natural gas refineries, precious metal mines, waste incineration plants (e.g., domestic waste, hazardous waste, or sewage sludge incineration plants), other plants for high-temperature processes (e.g., cement burning), and high-temperature plants co-fired with waste or combined (multistage) high-temperature plants (e.g., power stations or cement rotary kilns having an upstream waste pyrrolysis or waste gasification). The sorbent compositions may be introduced into a gas stream derived from a heat generating system selected from the group consisting of a combustion system, a power plant combustion system, a coal combustion system, a waste incineration system, a kiln, a kiln for mining operations, a recovery boiler, a coal gasification process stream, a gas production stream, a biomass combustion system, and an ore processing system.

The sorbent compositions may be used in processes of any dimension. The methods can be used in processes having a flue gas volumetric flow rate of $15 \times 10^3$ m$^3$ S.T.P. db/h, for example for sewage sludge incineration, or of $50 \times 10^3$ m$^3$ S.T.P. db/h, for example in hazardous waste incineration plants, or of $150 \times 10^3$ m$^3$ S.T.P. db/h, for example in domestic waste incineration, and also in large power stations having, for example, $2-3 \times 10^6$ m$^3$ S.T.P. db/h.

In certain embodiments, a process of treating a gas stream containing mercury and acid gases, including but not limited to sulfur oxides and hydrogen halides, comprises applying a sorbent into said gas stream ahead of a particulate matter collection device, in order to adsorb or oxidize at least a portion of a mercury containing compound and at least a portion of an acid gas containing compound. The particulate matter collection device may be one or more of the following devices: electrostatic precipitation (ESP), filtration, inertial separation, baghouse, cyclone, spray dry absorber (SDA), wet fluegas desulfurizer (wFGD), or any combination thereof. In certain embodiments, there are a plurality of particulate collection devices; optionally wherein one of said particulate collection devices are positioned subsequent to another particulate collection device.

In certain embodiments, the sorbent composition may be applied to the gas stream by housing the sorbent in a fixed bed apparatus through which the gas stream is made to pass. In another embodiment, the sorbent composition may be contained within a fiber bag used in a filter baghouse. In another embodiment, the sorbent composition may be applied to the gas stream through various methods known in the art, for example, through a lance, an additional medium such as a fuel source (e.g., coal), a conveyor belt, or one or more ports in communication with a combustion system (e.g., asymmetrically placed ports). The sorbent composition may be exposed to a gas stream by applying said sorbent into the gas stream with a carrier gas; optionally wherein said carrier gas is air or nitrogen; optionally wherein said carrier gas is applied upstream of a particulate control device; and optionally wherein said particulate matter collection device contains at least one of the following devices: ESP, baghouse, or cyclone.

The temperature of the gas stream into which the sorbent composition is applied may be between 200° F. and 900° F. The gas stream may contain at least one of the following halogens: chloride, bromide, iodide, and salts thereof. The gas stream may contain sulfur dioxide and sulfur trioxide. The gas stream may contain mercury.

In one exemplary embodiment, the sorbent is injected into the flue gas of a coal fired power plant at a location between the air preheater and the particulate control device. To carry out the injection, the sorbent is fed from a feeding silo and pneumatically carried through injection lances positioned within the flue gas duct work thereby affording a fine dispersion of the material within the flue gas, covering the entire cross-sectional area of the duct. Sorbent feed rates are determined gravimetrically and set in the range of 0.1 to 10 lb/MMacf according to the desired mercury capture targets. The capture of mercury from the flue gas by the sorbent is verified by measurements of flue gas mercury concentrations made by Appendix K sorbent traps and continuous mercury emission monitors (Hg-CEMs), as well as by measurement of the level of mercury in ash.

In another exemplary embodiment, the sorbent is injected into the flue gas of a coal fired power plant at a location upstream of the air preheater and the particulate control device. To carry out the injection, the sorbent is fed from a feeding silo and pneumatically carried through injection lances positioned within the flue gas duct work thereby affording a fine dispersion of the material within the flue gas, covering the entire cross-sectional area of the duct. Sorbent feed rates are determined gravimetrically and set in the range of 1 to 15 kilograms per cubic meter of flue gas according to the desired reduction targets for hydrogen chloride and sulfur oxide. The capture of hydrogen chloride from the flue gas by the sorbent is verified by measurements of flue gas hydrogen chloride concentrations made by infrared spectrometers (e.g. FTIR and/or NDIR) and wet-chemical sampling methods (e.g. EPA Method 26A).

In another exemplary embodiment, the sorbent is injected into the flue gas of a coal fired power plant at a location between the air preheater and the particulate control device. To carry out the injection, the sorbent is fed from a feeding silo and pneumatically carried through injection lances positioned within the flue gas duct work thereby affording a fine dispersion of the material within the flue gas, covering the entire cross-sectional area of the duct. Sorbent feed rates are determined gravimetrically and set in the range of 1 to 15 kilograms per cubic meter of flue gas according to the desired reduction targets for hydrogen chloride and sulfur oxide. The capture of hydrogen chloride from the flue gas by the sorbent is verified by measurements of flue gas hydrogen chloride concentrations made by infrared spectrometers (e.g. FTIR and/or NDIR) and wet-chemical sampling methods (e.g. EPA Method 26A).

In certain embodiments, a method comprises monitoring sulfur oxide and hydrogen chloride emissions and responding with the addition of said sorbent in accordance with the acid gas levels in said system. In certain embodiments, a method comprises monitoring mercury emissions and responding with the addition of said sorbent in accordance with the mercury levels in said system. In certain embodiments, a method comprises monitoring sulfur oxide and hydrogen chloride emissions, and mercury emissions, and responding with the addition of said sorbent in accordance with the levels in said system.

In certain embodiments, the sorbent composition may be applied to the gas stream with one or more additional components. The sorbent composition may be applied to the gas stream by application as a slurry blended with alkaline sulfur oxide sorbents such as but not limited to trona, calcium hydroxide, lime, hydrated lime, or calcium oxide containing compounds or materials or combinations thereof such as described in U.S. Pat. No. 5,334,564 and U.S. Pat. No. 5,520,898, which are herein incorporated by reference, e.g. via a spray dryer.

In certain embodiments, the sorbent or sorbent slurry may be mixed with an alkaline sulfur oxide sorbent slurry in a slurry holding tank, feed tank, recirculation line, feed line, or in-line with a mixing chamber prior to application of the slurry to the gas stream. An example of a mixing chamber is described in U.S. Pat. No. 7,550,060, "Method and Arrangement for Feeding Chemicals into a Process Stream". This patent is herein incorporated by reference. In one embodiment, the mixing chamber comprises a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber. The mixing chamber can then be attached or in communication with a receptacle that holds/processes through (e.g. a conduit) a mixed product.

In certain embodiments, the alkaline sulfur oxide sorbent is applied upstream of the sorbent. In a further embodiment, the sulfur oxide alkaline-containing sorbent is added separately from the sorbent by such methods as FSI (Furnace Sorbent Injection).

In certain embodiments, the sorbent compositions may applied as a powder blended with other mercury sorbents such as but not limited to activated carbon, halogenated activated carbon (e.g., chlorinated activated carbon or brominated activated carbon), and inorganic mercury sorbents. Alternatively, the mercury sorbent may be applied upstream of the sorbent composition. The mercury sorbent may be added separately from the sorbent composition by such methods as DSI (Duct Sorbent Injection).

In certain embodiments, the sorbent composition may be applied to the gas stream with an oxidizing agent. The oxidizing agent may be combined with the sorbent composition prior to treatment of a flue gas. In certain embodiments, the oxidizing agent may be applied to the gas stream prior to, after, and/or at the same time of application of the sorbent composition to the flue gas. The oxidizing agent may be conveyed into the gas stream through one or more mediums. In certain embodiments, the medium is coal and said gas stream derives from at least a coal combustion system. The oxidizing agent may be selected from the group consisting of: a thermolabile molecular halogen, calcium bromide, and halogen-containing compounds such as but not limited to hydrogen bromide, hydrogen chloride, ammonium bromide, ammonium chloride, sodium chloride, sodium bromide, calcium chloride or combinations thereof.

In certain embodiments, the sorbent composition may be applied to the gas stream without any additional oxidizing agent. The sorbent composition may act as an oxidizing agent for elemental mercury in the gas stream. The sorbent compositions may serve as both an oxidant and a sorbent to remove elemental mercury from a flue gas stream.

In certain embodiments, the sorbent composition is capable of being traced in a gas stream. The sorbent composition may contain one or more moieties or contain one or more functional groups capable of being quantitated by one or more analytical techniques or quantitation protocols. In certain embodiments, the moieties may be magnetic. For example, the magnetic moieties may be incorporated into the silica-containing particles as described in this disclosure and equivalents thereof. One of ordinary skill in the art would be able to incorporate the moieties, e.g. magnetic moieties into the particle, e.g. silica-containing particle. In another embodiment, the moieties are metallic. For example, metallic moieties may be incorporated into the silica-containing particles as described in this disclosure and equivalents thereof. In another embodiment, the sorbent composition may be monitored by fluorescence and/or absorbance measurements. In another embodiment, the sorbent composition may be monitored by magnetic and/or metal detectors.

5. EXAMPLES

The foregoing may be better understood by reference to the following examples, which are presented for purposes of illustration and are not intended to limit the scope of the invention.

Example 1

In this example, three solutions were prepared: A) 100 g Nalco 8691 silica sol (available from Nalco Company, Naperville, Ill.), B) 0.5 g copper sulfate and 3 g glacial acetic acid dissolved in 61.8 g DI water, and C) 1.38 g calcium polysulfide solution and 7.5 g 25 wt % ammonia dissolved in 53.2 g DI water. Solution B was added to solution A, followed by subsequent addition of solution C at a high shear rate. After mixing, 215 g of DI water was added at a high shear rate. The mixture with 3 wt % solid content (molar ratio of $SiO_2$/Cu=100/1) was stirred for 1-2 minutes. 36.9 g of aqueous slurry was sprayed onto 56.1 g of CaO with a spray bottle while stirring in a round bottom flask to yield a final dry-flowing powder with a theoretical formula of $(SiO_2)_{100}(OH)_y \cdot CuS_5 \cdot 5827 Ca(OH)_2$. The theoretical formula is calculated by initial mass of each component. Nalco 8691 can be purchased from Nalco Company, 1601 W. Diehl Road, Naperville, Ill., 60563.

Nitrogen sorption analysis of the powder was performed on an Autosorb-1C unit from Quantachrome. The sample was degassed at 150° C. for 6 h, and then characterized by a multi-point BET surface area, total pore volume, and BJH adsorption pore size distribution. Nitrogen sorption analysis indicated a surface area of 10.7 square meters per gram, a pore volume of 0.05 cc/g, and a pore diameter of 18.6 nm. TGA analysis of the powder indicated 2.3 wt % mass loss due to moisture.

The acid gas removal efficiency was evaluated using a NETZSCH TGA/DTA analyzer (model: STA 449 F3 Jupiter). 5 g of sorbent was evenly placed in an alumina plate that was subjected to an atmosphere of 750 ppm $HCl_{(g)}$ at 200° C. The mass increase of substrate resulting from HCl capture was measured to determine the HCl capture efficiency and uptake rate. The experiment showed 12.0% of capture efficiency and 0.20%/min$^{-1}$ of uptake rate compared to 12.8% efficiency of conventional hydrated lime.

Example 2

In this example, three solutions were prepared: A) 100 g Nalco 8691 silica sol, B) 3.32 g copper sulfate and 3 g glacial acetic acid dissolved in 55.1 g DI water, and C) 9.2 g calcium polysulfide solution and 7.5 g 25 wt % ammonia dissolved in 145.2 g DI water. Solution B was added to solution A, followed by subsequent addition of solution C at a high shear rate. After mixing, 300 g of DI water was added at a high shear rate. The mixture with 3 wt % solid content (molar ratio of $SiO_2/Cu=15/1$) was stirred for 1-2 minutes. 37.6 g of aqueous slurry was sprayed onto 56.1 g of CaO with a spray bottle while stifling in a round bottom flask to yield a final dry-flowing powder with a theoretical formula of $(SiO_2)_{15}(OH)_y \cdot CuS_5 \cdot 1196\ Ca(OH)_2$. Nalco 8691 can be purchased from Nalco Company, 1601 W. Diehl Road, Naperville, Ill., 60563.

Nitrogen sorption analysis of the powder was performed on an Autosorb-1C unit from Quantachrome. The sample was degassed at 150° C. for 6 h, then characterized by a multi-point BET surface area, total pore volume, and BJH adsorption pore size distribution. Nitrogen sorption analysis indicated a surface area of 25.6 square meters per gram, a pore volume of 0.15 cc/g, and a pore diameter of 23.2 nm. TGA analysis of the powder indicated 8.7 wt % mass loss due to moisture.

The acid gas removal efficiency was evaluated using a NETZSCH TGA/DTA analyzer (model: STA 449 F3 Jupiter). 5 g of sorbent was evenly placed in an alumina plate that was subjected to an atmosphere of 750 ppm $HCl_{(g)}$ at 200° C. The mass increase of substrate resulting from HCl capture was measured to determine the HCl capture efficiency and uptake rate. The experiment showed 20.7% of capture efficiency and 0.17%/min$^{-1}$ of uptake rate compared to 12.8% efficiency of conventional hydrated lime Example 3

In this example, three solutions were prepared: A) 25 g Nalco 8691 silica sol, B) 12.45 g copper sulfate and 3 g glacial acetic acid dissolved in 200 g DI water, and C) 39.5 g calcium polysulfide solution and 7.5 g 25 wt % ammonia dissolved in 200 g DI water. Solution B was added to solution A, followed by subsequent addition of solution C at a high shear rate. After mixing, 425 g of DI water was added at a high shear rate. The mixture with 3 wt % solid content (molar ratio of $SiO_2/Cu=1/1$) was stirred for 1-2 minutes. 38.6 g of aqueous slurry was sprayed onto 56.1 g of CaO with a spray bottle while stifling in a round bottom flask to yield a final dry-flowing powder with a theoretical formula of $(SiO_2)(OH)_y \cdot CuS_5 \cdot 441 Ca(OH)_2$. Nalco 8691 can be purchased from Nalco Company, 1601 W. Diehl Road, Naperville, Ill., 60563.

Nitrogen sorption analysis of the powder was performed on an Autosorb-1C unit from Quantachrome. The sample was degassed at 150° C. for 6 h, then characterized by a multi-point BET surface area, total pore volume, and BJH adsorption pore size distribution. Nitrogen sorption analysis indicated a surface area of 20.4 square meters per gram, a pore volume of 0.18 cc/g, and a pore diameter of 34.7 nm. TGA analysis of the powder indicated 3.8 wt % mass loss due to moisture.

The acid gas removal efficiency was evaluated using a NETZSCH TGA/DTA analyzer (model: STA 449 F3 Jupiter). 5 g of sorbent was evenly placed in an alumina plate that was subjected to an atmosphere of 750 ppm $HCl_{(g)}$ at 200° C. The mass increase of substrate resulting from HCl capture was measured to determine the HCl capture efficiency and uptake rate. The experiment showed 16.8% of capture efficiency and 0.22%/min$^{-1}$ of uptake rate compared to 12.8% efficiency of conventional hydrated lime Example 4

In this example, three solutions were prepared: A) 4 kg Nalco 8691 silica sol, B) 132 g copper sulfate and 120 g glacial acetic acid dissolved in 1.75 L DI water, and C) 368 g calcium polysulfide solution and 300 g 25 wt % ammonia dissolved in 5.33 L DI water. The solutions were mixed sequentially in an in-line mixing apparatus that included further dilution at a 1:1 v:v ratio after the slurry was prepared. The ~3.75 wt % slurry was then ground with a homogenizer at 24,000 rpm to obtain a slurry solution with an average particle size of 23.7 μm. 2.249 kg of the prepared slurry was sprayed onto 3.5 kg of CaO while stifling in a plow mixer (Littleford Day model M-DVT22) to yield a final dry-flowing powder (Sample 4), with a theoretical formula of $(SiO_2)_{15}(OH)_y \cdot CuS_5 \cdot 1251\ Ca(OH)_2$. Nalco 8691 can be purchased from Nalco Company, 1601 W. Diehl Road, Naperville, Ill., 60563.

Nitrogen sorption analysis of the powder was performed on an Autosorb-1C unit from Quantachrome. The sample was degassed at 180° C. for 5 h, and then characterized by a multi-point BET surface area, total pore volume, and BJH adsorption pore size distribution. Nitrogen sorption analysis indicated a surface area of 40.1 square meters per gram, a pore volume of 0.20 cc/g, and a pore diameter of 20.0 nm.

The acid gas removal efficiency was evaluated using a NETZSCH TGA/DTA analyzer (model: STA 449 F3 Jupiter). 5 g of sorbent was evenly placed in an alumina plate that was subjected to an atmosphere of 750 ppm $HCl_{(g)}$ at 200° C. The mass increase of substrate resulting from HCl capture was measured to determine the HCl capture efficiency and uptake rate. The experiment showed 25.7% of capture efficiency and 0.39%/min$^{-1}$ of uptake rate compared to 12.8% efficiency of conventional hydrated lime.

Example 5

Simultaneous mercury and hydrogen chloride capture efficiency of sorbents was examined in a fixed-bed reactor coupled with a multiple gas analyzer (EcoChem MC3 analyzer) for monitoring HCl, $SO_2$, NO, $CO_2$, and $O_2$ via FT-IR and two mercury continuous emission monitors (CEM) (VM-3000 mercury vapor analyzers) for detecting baseline and captured Hg concentration through the UV adsorption method. A well-mixed simulated flue gas stream with the specific composition listed in Table 1 was divided to simultaneously measure the inlet Hg concentration (denoted as Z1) and the outlet Hg concentration (denoted as Z3) after reaction with the fixed sorbent bed. The reaction was conducted for 1 hour. The Hg and HCl capture efficiency is defined as the following equations at 1 hr.

$$\text{HCl capture efficiency} = \left(1 - \frac{[\text{HCl}]}{[\text{HCl}]_0}\right) * 100\%$$

$$\text{Hg capture efficiency} = \left(1 - \frac{[\text{Hg}]^{Z3}}{[\text{Hg}]^{Z1}}\right) * 100\%$$

[HCl] is the remaining HCl concentration in the flue gas after capture by the sorbent bed at 1 hr. $[\text{HCl}]_0$ is the initial HCl concentration (6 ppm). $[\text{Hg}]^{Z3}$ is the remaining Hg concentration obtained from Z3 CEM at 1 hr. $[\text{Hg}]^{Z1}$ is the baseline of Hg concentration obtained from Z1 CEM at 1 hr.

TABLE 1

Simulated flue gas composition in nitrogen.

| Gas | Concentration |
|---|---|
| $SO_2$ | 400 ppm |
| $NO_x$ | 200 ppm |
| $CO_2$ | 12 vol % |
| $O_2$ | 5 vol % |
| HCl | 6 ppm |
| Hg | 15 µg/m³ |

A series of sorbents were tested in the fixed bed reactor to determine both Hg and HCl capture efficiencies, including a multi-pollutant sorbent (Sample 4), a silica-containing hydrated lime, conventional hydrated lime, and a mixture of copper sulfide-doped silica in diatomaceous earth with the same active concentration as Sample 4. The sorbent sample mass used for each experiment was held constant. FIG. 1 represents Hg concentration in the flue gas as a function of reaction time by four different sorbents. Both sorbent A (Sample 4) and B (the mixture of copper sulfide-doped silica and diatomaceous earth) showed significant Hg reduction efficiencies of 97 and 91%, respectively, with different kinetics. A faster initial Hg removal rate was observed with sorbent B rather than A, likely due to the more exposed surface area of copper sulfide-doped silica present in sorbent B. However, no increase of Hg concentration was found in sorbent A at the end of reaction time, demonstrating that the presence of hydrated lime as a substrate of the dual-pollutant sorbent improves the overall capacity of the mercury sorbent. Notably, there is a moderate Hg capture (~50% efficiency) on other calcium-based sorbents (C and D), which is believed to be associated with Hg oxidation by the reaction product ($CaCl_2$) formed with HCl.

Figure 2:
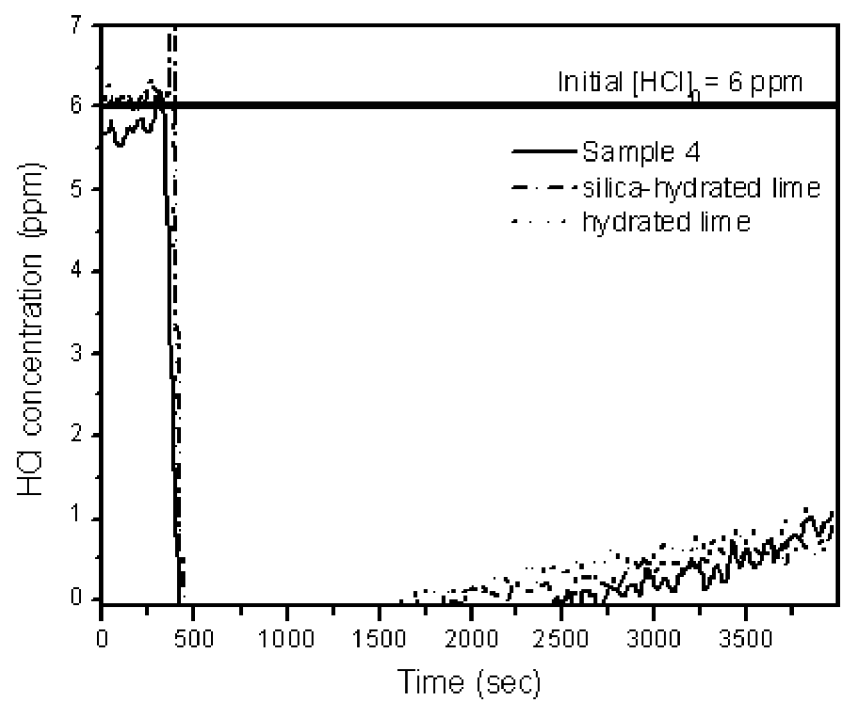
FIG. 2 depicts HCl reduction as a function of time by various sorbents.

FIG. 2 represents the HCl concentration change versus time by individual sorbent bed. As expected, HCl was consumed 100% initially by the hydrated lime present in each sorbent bed. HCl breakthrough was observed for each of the three sorbents during the course of reaction. Sample 4 showed the latest breakthrough time than others, indicating a higher HCl capacity of Sample 4. No HCl adsorption was detected in the mixture of copper sulfide-doped silica and diatomaceous earth (data not shown).

Incorporation of the metal sulfide-doped silica during the lime hydration process to form a dual-pollutant sorbent provides unexpected benefits for the performance of each component as shown in both FIGS. 1 and 2. In addition to the economic benefit of using lime hydration as a metal sulfide-doped silica slurry drying method, the presence of the metal sulfide-doped silica on the hydrated lime surface maintained longer HCl and Hg removal compared to control samples.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A process of treating a gas stream containing mercury, comprising applying a sorbent composition into said gas stream ahead of a particulate matter collection device, in order to adsorb at least a portion of a mercury containing compound, wherein said sorbent composition comprises a compound having formula (I),

$(SiO_2)_x(OH)_yM_zS_aF.B$      (I)

wherein

M is a metal or metalloid cation selected from the group consisting of: boron, magnesium, aluminum, calcium, titanium, vanadium, manganese, iron, cobalt, nickel, copper, zinc, zirconium, molybdenum, palladium, silver, cadmium, tin, platinum, gold, and bismuth;

S is a sulfur-based species selected from the group consisting of: sulfide salts, dithiocarbamates, polymer-based dithiocarbamates, and polysulfide salts;

F optionally exists and when present is selected from the group consisting of: a functionalized organosilane, a sulfur-containing organosilane, an amine-containing organosilane, and an alkyl-containing organosilane at a surface area coverage of about 0.01 to about 100%;

B is a hygroscopic solid at a preferred water solid molar ratio of about 0.1 to about 6;

the molar ratio of y/x is equal to about 0.01 to about 0.5;
the molar ratio of x/z is equal to about 0.5 to about 300; and
the molar ratio of a/z is about 0.5 to about 5.

2. A process of treating a gas stream containing mercury, comprising applying a sorbent composition into said gas stream ahead of a particulate matter collection device, in order to oxidize at least a portion of a mercury containing compound, wherein said sorbent composition comprises a compound having formula (I), $$(SiO_2)_x(OH)_y M_z S_a F \cdot B \qquad (I)$$

wherein
M is a metal or metalloid cation selected from the group consisting of: boron, magnesium, aluminum, calcium, titanium, vanadium, manganese, iron, cobalt, nickel, copper, zinc, zirconium, molybdenum, palladium, silver, cadmium, tin, platinum, gold, and bismuth;
S is a sulfur-based species selected from the group consisting of: sulfide salts, dithiocarbamates, polymer-based dithiocarbamates, and polysulfide salts;
F optionally exists and when present is selected from the group consisting of: a functionalized organosilane, a sulfur-containing organosilane, an amine-containing organosilane, and an alkyl-containing organosilane at a surface area coverage of about 0.01 to about 100%;
B is a hygroscopic solid at a preferred water solid molar ratio of about 0.1 to about 6;
the molar ratio of y/x is equal to about 0.01 to about 0.5;
the molar ratio of x/z is equal to about 0.5 to about 300; and
the molar ratio of a/z is about 0.5 to about 5.

3. The process of claim 1, wherein said particulate matter collection device is one or more of the following devices: electrostatic precipitation (ESP), filtration, inertial separation, baghouse, cyclone, spray drier absorber, or wet flue gas desulfurizer.

4. The process of claim 1, wherein said gas stream derives from a heat generating system and wherein said heat generating system is at least one of the following: a combustion system; a power plant combustion system; a coal combustion system; a waste incineration system; a kiln; a kiln for mining operations; a recovery boiler; a coal gasification process stream; a gas production stream; biomass combustion system; and an ore processing system.

5. The process of claim 1 in which the sorbent composition is exposed to the gas stream by applying said sorbent into the gas stream with a carrier gas; optionally wherein said carrier gas is as air or nitrogen; optionally wherein said carrier gas is applied upstream of the particulate control device; and optionally wherein said particulate matter collection device contains at least one of the following devices: ESP, baghouse, cyclone, spray drier absorber, or wet flue gas desulfurizer.

6. The process of claim 1 in which the sorbent composition is applied to the gas stream by application as a slurried blend with alkaline sulfur oxide sorbents and optionally upstream of the sorbent.

7. The process of claim 6 in which the sorbent composition or a slurry thereof is mixed with the alkaline sulfur oxide sorbent slurry in a holding tank, feed tank, recirculation line, feed line, or mixing chamber prior to application of the slurry to the gas stream.

8. The process of claim 1 in which the sorbent composition is applied to the gas stream by housing the sorbent in a fixed bed apparatus through which the gas stream is made to pass.

9. The process of claim 1 in which the sorbent composition is applied to the gas stream by entraining the sorbent with the gas stream in a fluidized bed device.

10. The process of claim 1, wherein the sorbent composition further comprises 1-50% activated carbon.

11. The process of claim 1 further comprising: applying an oxidizing agent to the flue gas.

12. The process of claim 11, wherein said oxidizing agent is applied prior to said sorbent composition.

13. The process of claim 11, wherein said oxidizing agent is at least one of the following: a thermolabile molecular halogen, calcium bromide, and a halogen-containing compound.

14. The process of claim 1, wherein there are a plurality of particulate collection devices; optionally wherein one of said particulate collection devices are positioned subsequent to another particulate collection device.

15. The process of claim 1 wherein a sulfur oxide alkaline-containing sorbent is added separately from the sorbent composition by such methods as FSI.

16. The process of claim 1 wherein the sorbent composition is combined with other inorganic mercury sorbents.

17. The process of claim 10 where the activated carbon is replaced with or mixed with halogenated activated carbon.

18. The process of claim 10 wherein the activated carbon is prepared from carbon based starting materials of coal, lignite, wood, wood byproducts, or bark.

19. The process of claim 1, wherein the gas stream contains at least one of the following halogens: chloride, bromide, or iodide, or salts thereof.

20. The process of claim 11, wherein the oxidizing agent is applied to the gas stream at least at one of the following time points: prior to, after, or at the same time of said application of said sorbent composition to the flue gas.

21. The process of claim 11 wherein said oxidizing agent is conveyed into the gas stream through one or mediums.

22. The process of claim 21, wherein said medium is coal and said gas stream derives from at least a coal combustion system.

23. The process of claim 1, wherein said sorbent composition further contains one or more halogens.

24. The process of claim 1, wherein said sorbent composition is capable of being traced in said gas stream.

25. The process of claim 1, wherein said sorbent composition contains one or more moieties or contains one or more functional groups capable of being quantitated by one or more analytical techniques or quantitation protocols.

26. The process of claim 25, wherein the moieties are magnetic.

27. The process of claim 1, wherein said sorbent composition is monitored by fluorescence and/or absorbance measurements.

28. The process of claim 1, further comprising monitoring mercury emissions system and responding with the addition of said sorbent composition in accordance with the mercury levels in said system.

* * * * *